Aug. 13, 1940.　　　M. R. HUTCHISON, JR　　2,211,464
POWER TRANSMISSION DEVICE
Filed Feb. 8, 1939　　2 Sheets-Sheet 1

INVENTOR
MILLER R. HUTCHISON JR.
BY
his ATTORNEY

INVENTOR
MILLER R. HUTCHISON JR.
BY
ATTORNEY

Patented Aug. 13, 1940

2,211,464

UNITED STATES PATENT OFFICE 2,211,464

POWER TRANSMISSION DEVICE

Miller R. Hutchison, Jr., Rochester, N. Y., assignor, by mesne assignments, to Paul Kollsman, New York, N. Y.

Application February 8, 1939, Serial No. 255,203

8 Claims. (Cl. 74—64)

This invention relates to power transmission devices, more particularly to devices for transmitting power from a first rotating to a second rotatable element.

It is an object of this invention to provide a mechanical power transmission mechanism capable of transmitting torque and rotary movement from a driving to a driven member at various ratios of transmission in one or the opposite direction.

More particularly, the invention aims at providing a mechanism capable of rotating a driven member at varying speeds and torques in automatic response to the magnitude of a load imposed on said driven member without the use of gears.

It is a further object of this invention to combine in a unitary structure means for automatically selecting a proper rate of transmission in response to variations in load and speed.

As a further object, this invention aims at providing a motion and torque transmitting device capable of automatically selecting a proper ratio of transmission and having elements of simple rugged construction assembled within a minimum of space and capable of functioning for extended periods without attention or objectionable wear.

A further object of this invention is to provide in a power transmission mechanism between rotating elements, a driving connection permitting a relatively large change of phase angle in either direction without slipping and also parallel displacement between the axes of rotation of the driving and driven member.

It is another object of this invention to provide a power transmission device for connecting rotatable elements capable of limiting the maximum load imposed on the driving element and even permitting temporary stalling of the driven element under conditions of excessive load.

Still another object of this invention is to provide a power transmission mechanism for connecting rotating elements which will under conditions of excessive load exert torsional impacts on the driven member and which is also capable of picking up a load from rest and accelerating the load to varying rotative speeds in dependence on the magnitude of the load.

Further aims, objects and advantages will appear from a consideration of the description which follows with accompanying drawings showing for purely illustrative purposes embodiments of this invention. It is to be understood, however, that the description is not to be taken in a limiting sense, the scope of this invention being defined in the appended claims.

Referring to the drawings.

Figures 1, 2:
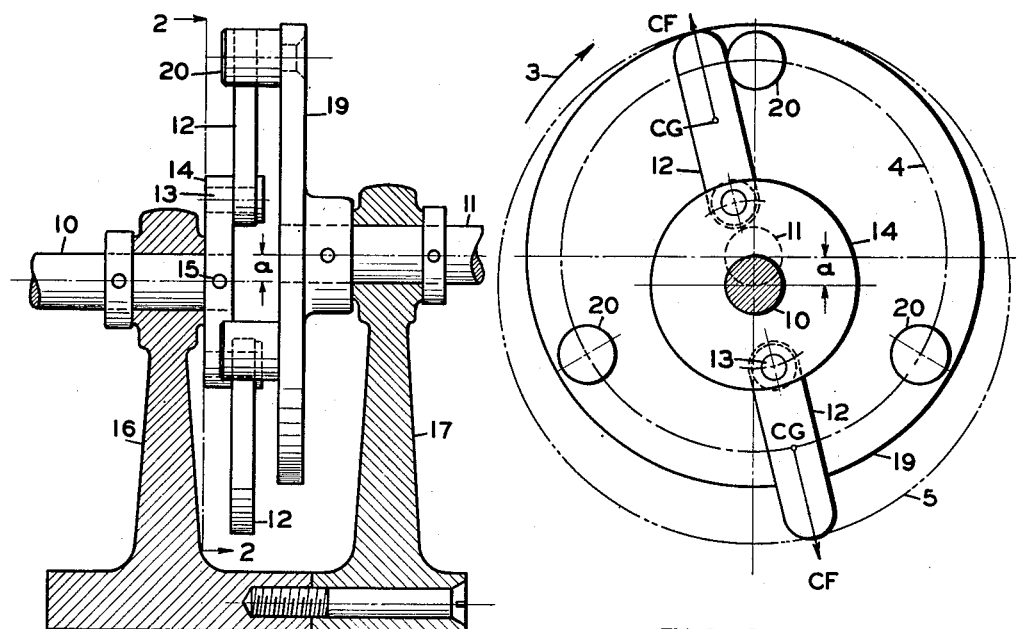
Fig. 1 is an elevation, partly in section, of a power transmission device embodying this invention.
Fig. 2 is a section taken on line 2—2 of Fig. 1.

The basic structure and the operating principles of the mechanical power transmission mechanism according to this invention is illustrated and may be understood from the following exposition.

Between the driving member 10 which, for example, may be the armature shaft of an electric motor and the driven member 11, there is located the power transmitting mechanism of the present invention.

The device includes in combination with the driving and driven member, an energy storing member, the arrangement of the members being such that the ratio of transmission is automatically modified when the torque required by the driven member exceeds a predetermined value, the value being a function of the rotating speed of the driving member.

In the drawings, there is shown as an energy storing member, one or more movable arms 12 preferably of hardened steel and rectangular cross section, journalled at one end on a suitable pivot or pin 13 which is firmly supported in a flange 14 forming a part of the driving member to which it may be secured by means of a pin 15.

Driving and driven members are mounted in bearing pedestals 16 and 17 in such manner that the axes of rotation are parallel, but spaced or offset from each other by a distance a. The driven member 11 is shown as also comprising a flange 19 secured to the shaft 11, the flange being provided with one or a plurality of individual projections shown as studs 20, preferably also made of hardened steel.

In the illustrated embodiment, the studs are equidistantly spaced from one another, parallel to the axis of the driving member and are so arranged at least partially to lie within the compass of the movable arms as these swing about their supporting pivots during rotation of the driving member. The pitch circle of the studs is indicated at 4 and lies within a further circle 5 indicating the compass of the arms in extended position.

It will be apparent that rotation of the driving member about its axis will cause the arms to swing outwardly in response to centrifugal force CF acting upon them at their center of gravity CG and that the arms will come into driving relation with the studs.

Figure 2, in which accessory parts are omitted for the sake of clearness, shows the relative position of the parts upon rotation of the driving member in the direction indicated by the arrow 3 when no resistance to turning is offered by the driven member.

Due to the eccentric arrangement of the rotating parts, the projections or studs will make a periodic translatory movement relatively to the movable arm bearing against it during each rotation, thus compensating for the spacing of the axes of rotation.

Figure 3:
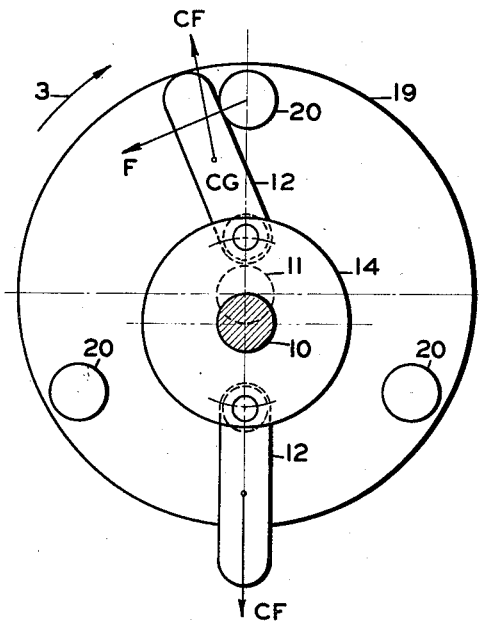

If a load is applied to the driven member, the parts will assume a position similar to that shown in Fig. 3 in which the driving arm is declined from its radial position by the reaction force exerted upon it by the studs, the contact forces being indicated by a vector F opposing the action of the centrifugal force represented by the vector CF.

Figure 4:
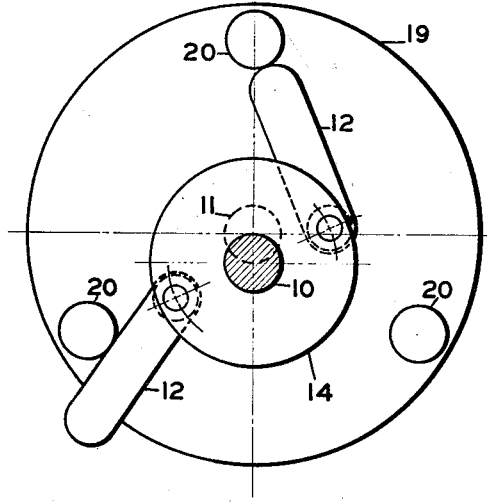
Figs. 3 and 4 illustrate various phases in the operation of the device shown in Fig. 1.

If the resistance of the driving member is further increased, the parts of the mechanism will assume the position shown in Fig. 4 in which the driving arm is shown as having been deflected into a position in which it is about to get out of engagement with the respective stud permitting a movement of the driving member ahead of the driven member.

Immediately after clearing the stud, the arm will be moved outwardly in response to centrifugal force. By this action and through acquiring angular velocity about its pivot, the arm absorbs or stores up energy from the driving motor during the period of disengagement.

If the load continues to exceed the magnitude of torque which one arm is capable of carrying, the driving member will continue to move ahead of the driven member and the arm which just became disengaged from the respective stud will strike the succeeding pin with a blow, the severeness of the blow being dependent on the centrifugal force restoring the arm from its deflected position.

Successive blows result in an increased torque exerted upon the driven member which under conditions of increased load rotates at a reduced but substantially constant speed which is a fraction of the speed of the driving shaft. The torque exerted upon the driven member under this condition may considerably exceed the torque which the source of power driving the shaft 10 is capable of exerting.

The power transmission device thus acts as a torque multiplying device and is comparable to a gear automatically shifting in response to the magnitude of a load.

If the load is further increased, the driven shaft 11 may stall without, however, causing stalling of the driving member. As soon as the load is decreased, the driving element 10 will pick up the load at a fraction of the speed of the driving shaft or at the full rate of rotation depending upon the magnitude of the load.

If during synchronous transmission, fluctuations in the magnitude of the load occur, the power transmission device permits a relatively large flexibility between the driving and the driven member in that a relatively large change in phase angle may occur without disturbing the engagement between the movable arms and projections or studs.

Thus it appears that the device performs the functions of a flexible coupling as well as the functions of a coupling for interconnecting misaligned or offset shafts and further the functions of a torque and motion transmitting mechanism having a ratio of transmission which is automatically matched to the magnitude of the load. Moreover, the device is operable in either direction and a reversal of the driven member is possible simply by reversing the direction of the driving member.

Figure 5:
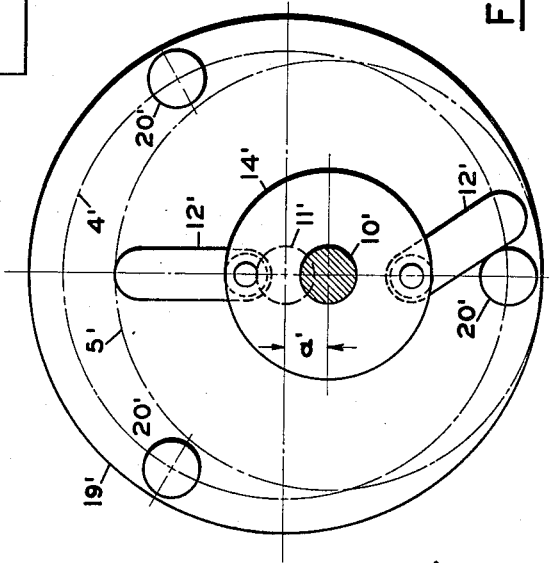
Fig. 5 is a modified form of a power transmission device embodying this invention.

A modified form of the invention is shown in simplified illustration in Fig. 5 in which the offset a', and the relation of the compass 5' of the movable arms 12' and the pitch circle 4' of the studs 20' are so arranged that the projections or studs will, during part of a revolution, be within and, during part of a revolution, be without the compass of the movable arms.

The device shown in Fig. 5 will permit a relatively greater reduction in speed than the device shown in Figs. 1 and 2 and is remotely comparable to a gear train including a pinion, represented in the illustrated embodiment by the driving member 10', and an inwardly toothed gear meshing with the pinion, represented by the driven member 11' carrying the projections 20'.

Figure 6:
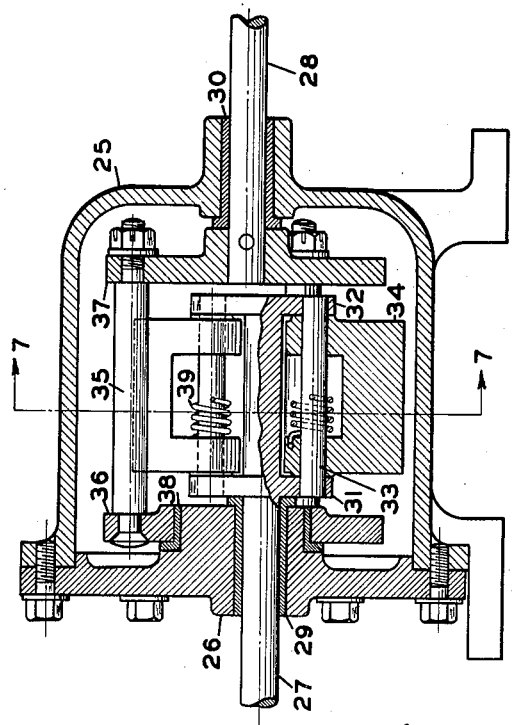
Fig. 6 is a side elevation, partly in section, of a power transmission device embodying this invention.
Figure 7:
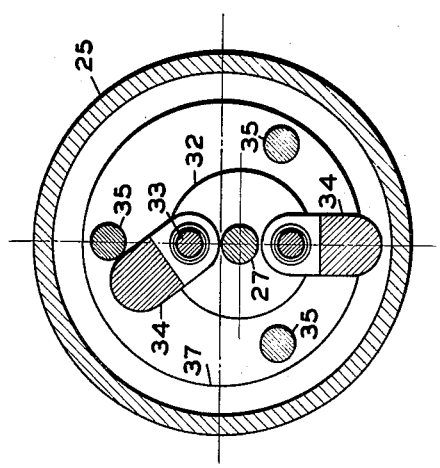
Fig. 7 is a section taken on line 7—7 of Fig. 6.

In Figs. 6 and 7 a practical embodiment of this invention is shown.

In a housing or casing 25 closed by an end plate 26, a driving and a driven shaft 27 and 28 are mounted in bushings 29 and 30 respectively. The driving shaft 27 is provided with flanges 31 and 32 bearing pivot pins or rods 33 supporting movable arms 34 with freedom to rotate with the driving shaft and also to move relatively to the shaft about the pivotal axis defined by the rods 33 which are parallel with and spaced from the axis of the driving shaft.

A plurality of rods 35 are firmly supported by flanges 36 and 37 thus forming a cage-like structure so arranged relatively to the driving elements that the arms 34 may bear against or strike the rods 35. The flange 36 is supported by a bushing 38 which is eccentrically arranged relatively to the axis of the driving shaft 27 and concentrically arranged with respect to the driven shaft 28.

Figure 8:
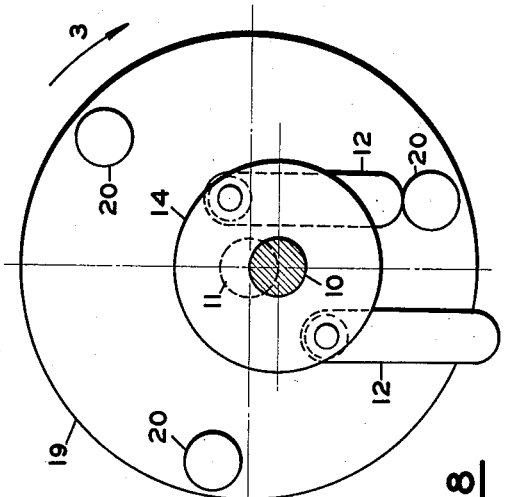
Fig. 8 illustrates another phase in the operation of the device shown in Fig. 1.

Means may be provided for preventing an accidental jamming of the power transmission mechanism when the device is started up from rest. A condition under which jamming may occur is shown diagrammatically in Fig. 8. When at rest, the arms responding to the force of gravity naturally hang downwardly. In starting from such a position, one arm may accidentally assume a position shown in Fig. 8 thus establishing a rigid driving link between the driving and driven members and temporarily inhibiting the normal action of the mechanism. To prevent the arm from assuming this position, it may be provided with biasing means normally tending to maintain the arm in a radial position when the device is at rest, thus counteracting gravitational force and effectively preventing jamming.

In the illustrated embodiment of Fig. 6, a spring 39 is shown acting between the pivotal rod 33 and the arm, thus tending to maintain the arms in a position radial with respect to the axis of the driving shaft 27.

The operation of the device shown in Figs. 6 and 7 will easily be understood from the previous exposition.

Obviously, the present invention is not restricted to the particular embodiments herein shown and described. Other forms of power transmission devices may be designed by mere modification of the illustrated embodiments without departing from the spirit of the present invention.

What is claimed is:

1. A power transmission device comprising, in combination, a first member rotatable about a first axis; a plurality of movable arms mounted on said member about second axes spaced from and parallel with said first axis with freedom to assume radial positions with respect to said first axis as well as freedom to make angular movements with respect to said radial positions; and a second member rotatable about an axis spaced from and parallel with said first axis, said second member having individual projections extending into the circular path of said arms rotating with said first member, said second member being so shaped as not to obstruct said arm except at said individual projections, whereby said first member will synchronously drive said second member through said arms bearing under action of centrifugal force against said projections, while, upon an increase in load on said second member, the speed of said second member will be automatically decreased to a substantially constant lower speed which is a fraction of the speed of the first member.

2. A power transmission device comprising, in combination, a first member rotatable about a first axis; a plurality of movable arms mounted on said member about second axes offset from and parallel with said first axis with freedom to assume radial positions with respect to said first axis as well as freedom to make angular movements with respect to said radial positions; a second member rotatable about an axis spaced from and parallel with said first axis; and a plurality of individual projections on said second member, said projections being of dissimilar number than there are arms and extending into the circular path of said arms rotating with said member.

3. A power transmission device comprising, in combination, a first member rotatable about a first axis; a plurality of movable arms mounted on said member about second axes spaced from and parallel with said first axis with freedom to assume radial positions with respect to said first axis as well as freedom to make angular movements with respect to said radial positions; a second member rotatable about a third axis spaced from and parallel with said first axis; and a plurality of individual projections on said second member substantially equidistantly spaced from said third axis and extending into the circular path of said arms rotating with said first member, said first and third axes being so spaced that some of the projections are at times within and at times without the compass of the said arms, whereby said first member will drive said second member through said arms engaging said projections under action of centrifugal force at a rate depending on the relative number of arms and projections, while, upon an increase in load on said second member, the rate of transmission is automatically changed and the second member driven at a substantially constant decreased speed.

4. In a power transmission device, the combination of a first member rotatable about a first axis; a movable arm mounted on said member about a second axis spaced from and parallel with said first axis with freedom to assume a radial position with respect to said first axis as well as freedom to make angular movements with respect to said radial position; and a second member rotatable about an axis offset from and parallel with said first axis, said second member having an individual projection extending into the circular path of said arm rotating with said first member, said second member being so shaped as not to obstruct said arm except at said individual projection.

5. A power transmission device comprising, in combination, a casing; a first shaft adapted to be driven by a rotary motor, said shaft being mounted in said casing; a plurality of movable arms pivotally connected to said first shaft about pivotal axes offset from and parallel with said first shaft, with freedom to assume radial positions with respect to said first shaft under action of centrifugal force; a second shaft mounted in said casing parallel with and spaced from said first shaft; and a cage enclosing said arms, said cage including a plurality of parallel bars spaced from said second shaft and arranged within the circular path of at least one of the arms, when in extended position, said cage being connected to said second shaft.

6. A power transmission device comprising, in combination, a casing; a first shaft adapted to be driven by a rotary motor, said shaft being mounted in said casing; a plurality of movable arms pivotally connected to said first shaft about pivotal axes spaced from and parallel with said first shaft, with freedom to assume radial positions with respect to said first shaft under action of centrifugal force; a second shaft mounted in said casing parallel with and spaced from said first shaft; and a cage enclosing said arms, said cage including a plurality of parallel bars spaced from said second shaft and arranged within the circular path of said arms, when in extended position, said cage being connected to said second shaft, whereby said first shaft will synchronously drive said second shaft through said arms bearing under action of centrifugal force against said projection, while, upon an increase in load on said second shaft, the speed of said second shaft will be automatically decreased to a substantially constant lower speed which is a fraction of the speed of the first shaft.

7. A power transmission device comprising, in combination, a first member rotatable about a first axis; a plurality of movable arms mounted on said member about second axes spaced from and parallel with said first axis with freedom to assume radial positions with respect to said first axis as well as freedom to make angular movements with respect to said radial positions; a second member rotatable about an axis spaced from and parallel with said first axis, said second member having individual projections extending into the circular path of said arms rotating with said first member, said second member being so shaped as not to obstruct said arm except at said individual projections; and means for resiliently biasing said arms towards a radial position with respect to said first axis.

8. A power transmission device comprising, in combination, a casing; a first shaft adapted to be driven by a rotary motor, said shaft being mounted in said casing; a plurality of movable arms pivotally connected to said first shaft about pivotal axes spaced from and parallel with said first shaft, with freedom to assume radial positions with respect to said first shaft under action of centrifugal force; a spring associated with each of said arms of sufficient force to maintain said arm in a radially extended position against the action of gravity when the device is at rest; a second shaft mounted in said casing parallel with and spaced from said first shaft; and a cage enclosing said arms, said cage including a plurality of parallel bars spaced from said second shaft and arranged within the circular path of at least one of the arms, when in extended position, said cage being connected to said second shaft.

MILLER R. HUTCHISON, Jr.